United States Patent

[11] 3,570,775

| [72] | Inventor | Donald C. Stavely<br>Scotia, N.Y. |
|---|---|---|
| [21] | Appl. No. | 692,483 |
| [22] | Filed | Dec. 21, 1967 |
| [45] | Patented | Mar. 16, 1971 |
| [73] | Assignee | General Electric Company |

[54] MICA DELAMINATION
5 Claims, 3 Drawing Figs.

[52] U.S. Cl. ........................................... 241/255
[51] Int. Cl. ........................................... B02c 4/10, B02c 19/12
[50] Field of Search ................................ 241/255--259, 245, 4, (Cursory)

[56] References Cited
UNITED STATES PATENTS

| 305,435 | 9/1884 | Dell | 241/255 |
| 389,310 | 9/1888 | Lister | 241/256 |
| 1,034,034 | 7/1912 | Rozelle | 241/255 |
| 2,072,598 | 3/1937 | Kile | 241/(Rubber elements digest) |
| 2,173,975 | 9/1939 | Lyons | 241/256X |

*Primary Examiner*—Donald G. Kelly
*Attorneys*—Howard I. Schlansker, Frank L. Neuhauser, Oscar B. Waddell and Melvin M. Goldenberg ABSTRACT: Flakes of micaceous material are delaminated by passing them at increasing speed through a progressively restricted annular space formed by a cylinder and a rotating inner rotor. The finely divided product is useful in making paper.

PATENTED MAR 16 1971
3,570,775
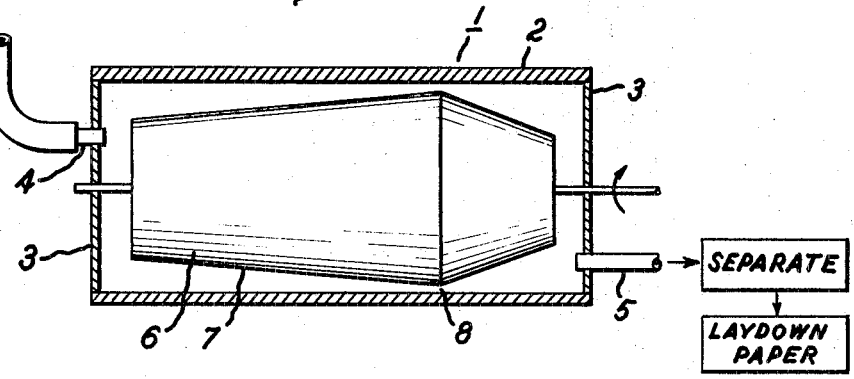
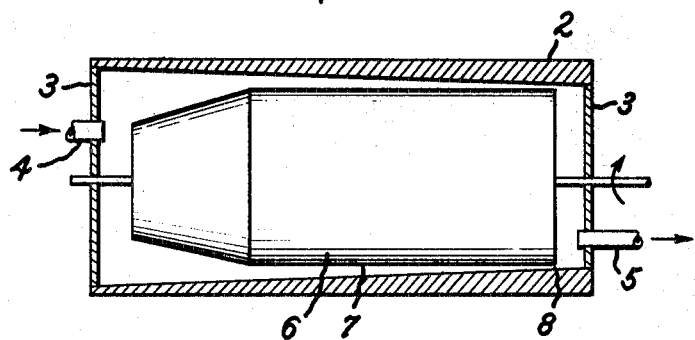
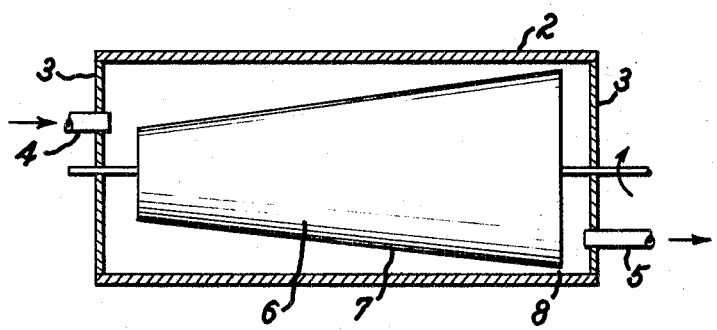
Inventor:
Donald C. Stavely,
by Howard J. Schlenker
His Attorney.

MICA DELAMINATION

This invention relates to the delamination of flakes of micaceous material. More particularly, it relates to new and useful mechanical means for delaminating mica flakes which at a very fine stage of delamination are useful for making paper.

Many devices and processes have been proposed for the delamination of mica. It has been proposed, for example, that liquid suspensions of mica flakes, with or without prior heating of the flakes, be passed through a drum or cylinder and therein acted upon by various mechanical means such as rotating blades as in U.S. Pat. No. 3,087,482 or to the rollers contained within the cylinder as in U.S. Pat. Nos. 2,380,741 and 2,482,740. It has also been suggested that mica flakes be delaminated by firing at elevated temperatures followed by treatment in successive solutions which produce a gas between the micaceous laminae which is then expanded by heat or reduced pressure. In still a further method, micaceous flakes are delaminated by firing at an elevated temperature which is followed by simple agitation in a liquid medium.

In general, the prior art methods of delaminating mica leave much to be desired in that they are slow in providing micaceous flakes of any particular size. They are further deficient in that papers laid down from pulps made of finely divided flakes so prepared are lacking in the physical strength which is desirable in further processing such paper or forming it into desired structures. It is accordingly a primary object of this invention to provide new and improved means for delaminating flakes of micaceous material.

The present invention can be applied to all types of micaceous material including muscovite, phlogopite, biotite, vermiculite and other micaceous materials which are formed of separable laminae. It has been found useful in the case of micaceous materials which have water forming hydroxyl groups such as muscovite to prefire such materials at an elevated temperature before they are subjected to the specific delamination process of this invention.

According to the present invention, prefired or unfired micaceous material is suspended in a nonreacting liquid such as water. The liquid suspension is then introduced into a progressively restricted annular space formed by a cylinder and an inner rotating rotor so that in its progression through the annular space the mica flakes are given a swirling motion and are aligned edgewise in the direction of travel, the progressively restrictive nature of the annular space producing an increase in downstream velocity which, in conjunction with the swirling motion, provides a shearing action between the stationary cylinder and rotating rotor which effectively delaminates the micaceous material. The size of the annular space and the rate of feed of the suspension through the delaminating device can be varied to provide any particular degree of delamination desired. Likewise, for any set of conditions the effluent or delaminated material can be further elutriated, screened or otherwise graded and a portion thereof recycled through the device for retreatment until a desired state of delamination has been achieved.

Those features of the invention which are believed to be novel are set forth with particularlity in the claims appended hereto. The invention will, however, be better understood and further advantages thereof appreciated from a consideration of the following description and the drawing in which FIG. 1 shows schematically a typical device of the present invention incorporated in a flow chart for the delamination of micaceous material, and FIGS. 2 and 3 show variations in the construction of the delaminating device.

Shown in FIG. 1 is a partially schematic flow chart for the delamination of micaceous material in which micaceous material is first fired at elevated temperatures for varying periods of time as desired, quenched in water and then introduced into the device of the present invention. This device 1 consists essentially of a cylindrical shell 2 closed at either end 3 and having an inlet 4 and an outlet 5 for the passage through the cylinder of the micaceous suspension to be treated. Mounted within cylinder 2 as shown for rotation about its longitudinal axis and that of cylinder 2 is a rotor 6, which is driven by any desired motive source not shown. The essentially smooth periphery 7 of rotor 6 is tapered toward the upstream direction as shown and also in the downstream direction from a point which is usually, although not necessarily, nearer the outlet end of the cylinder. This forms in a downstream direction in conjunction with the essentially smooth cylinder bore which can be uniform, as shown, or tapered, first a progressively restricted annular space to the point of the throat 8 which is the most restricted portion, after which the annular space becomes progressively larger. From a consideration of fluid flow, it will be seen that with a given input of micaceous suspension to the annular space between cylinder 2 and rotor 6, the velocity of the fluid flow will progressively increase as throat 8 is approached. This increasing velocity combined with the swirling or revolutionary velocity given the flakes by the rotation of rotor 6 along with the relative motion between the rotor and the stationary cylinder exerts a shearing force upon the mica flakes which effectively delaminates them. Shown in FIGS. 2 and 3 are several variations of the arrangement of cylinder and rotor, others of which will occur to those skilled in the art. In FIG. 2 the inner wall of cylinder 2 is tapered or thinner in an upstream direction, thus combining with the similarly tapered and then cylindrical periphery of rotor 6 to provide an annular space between cylinder and rotor of desired progressively restrictive nature. In FIG. 3 as opposed to FIGS. 1 and 2, the rotor is terminated at the throat 8 instead of being gradually tapered inwardly in a downstream direction from the throat as in FIG. 1.

The treated micaceous suspension leaves cylinder 2 through outlet 5, after which, if indicated, it can be further recycled and retreated. For example, it can be, as pointed out above, separated into various flake sizes and thicknesses by elutriation, screening and the like. The graded flakes so obtained can be used as such or, if desired, the thicker flakes can be recycled through the delaminating device for further delamination. Finely divided flakes can be, as indicated, laid down on paper-making machines in usual paper making fashion to form reconstituted mica or mica paper.

The following example will illustrate the actual practice of the invention, it being understood that it is exemplary only and not to be taken as limiting in any way since many variations may, as indicated above, be introduced in the practice of the present invention.

Muscovite mica was fired at a temperature of 800° C. for about 10 minutes and quenched in water. The liquid suspension of such flakes was fed into a device 1 as shown in FIG. 1, the length of cylinder 2 being 12 inches, the inside upstream diameter being about 6 inches with a ½° taper downstream to 5.46 inches at throat 8, the rotor having an upstream dimension of about 4.9 inches expanding to a maximum diameter of about 5.44 inches to form a throat passage 8 of about 0.01 inch. With the rotor 2 rotating at 900 r.p.m., a micaceous suspension having a concentration of 0.35 percent of mica was passed through device 1 at a rate of 5 to 6 gallons per minute. The output of micaceous flakes of a fineness small enough to form reconstituted paper was about 3.7 pounds per hour, such mica flakes being separated by elutriation and screening with the remainder of the liquid suspension being recirculated for further treatment. The mica paper prepared in usual paper making fashion from the flakes of suitable fineness had a thickness of 3 mils, a tensile strength of 4500 p.s.i. and a dielectric strength of 1000 volts/mil. This is as compared to a tensile strength of 1200 p.s.i. and a dielectric strength of 800 volts/mil for a mica paper prepared from micaceous material which had simply been fired at 860° C. for 9 minutes and then mixed by simple agitation in a water suspension to form a pulp.

I claim:

1. Apparatus for delaminating micaceous material in liquid suspension comprising:
   a. a closed cylinder having inlet and outlet means for said liquid suspension; and b. a rotor mounted within said cylinder and adapted for rotation about its longitudinal axis and that of said cylinder, the outer periphery of said rotor and the inner wall of said cylinder being essentially smooth and defining a progressively restricted annular passage in a downstream direction to a throat portion for passage therethrough of the mica suspension.

2. Apparatus as in claim 1 where said rotor is tapered in an upstream direction.

3. Apparatus as in claim 1 where the inner cylinder wall is tapered in an upstream direction.

4. Apparatus as in claim 3 where the periphery of said rotor is essentially cylindrical.

5. Apparatus as in claim 2 where said cylinder wall is essentially cylindrical.